United States Patent
Watanabe et al.

(10) Patent No.: US 6,577,494 B2
(45) Date of Patent: Jun. 10, 2003

(54) CONDUCTIVE PASTE AND LAMINATED CERAMIC ELECTRONIC COMPONENT

(75) Inventors: Shinya Watanabe, Yasu-gun (JP); Atsuyoshi Maeda, Otsu (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 09/923,840

(22) Filed: Aug. 8, 2001

(65) Prior Publication Data

US 2002/0043323 A1 Apr. 18, 2002

(30) Foreign Application Priority Data

Aug. 8, 2000 (JP) ........................................ 2000-239916

(51) Int. Cl.⁷ ................................................ H01G 4/06

(52) U.S. Cl. ..................... 361/321.2; 361/311; 361/313; 361/306.1; 361/306.3; 252/513; 252/514; 252/521

(58) Field of Search ................ 361/321, 306.1, 361/311, 313, 306.3, 321.1, 321.5, 309, 320, 312, 523, 528, 321.4, 34.2; 252/513, 514, 521

(56) References Cited

U.S. PATENT DOCUMENTS

| | | | | |
|---|---|---|---|---|
| 4,197,224 A | * | 4/1980 | Schmolzer et al. | 260/22 |
| 4,701,827 A | * | 10/1987 | Fujikawa et al. | 361/309 |
| 5,561,587 A | * | 10/1996 | Sanada | 361/306.1 |
| 5,822,176 A | * | 10/1998 | Sano et al. | |
| 6,060,165 A | * | 5/2000 | Asada et al. | |
| 6,156,237 A | * | 12/2000 | Kubota et al. | 252/512 |
| 6,217,821 B1 | * | 4/2001 | Donohue | |
| 6,478,882 B2 | * | 11/2002 | Miyazaki et al. | |
| 6,500,362 B2 | * | 12/2002 | Miki et al. | |

* cited by examiner

Primary Examiner—Dean A. Reichard
Assistant Examiner—Nguyen Ha
(74) Attorney, Agent, or Firm—Dickstein, Shapiro, Morin & Oshinsky, LLP.

(57) ABSTRACT

A conductive paste which can form conductive films having superior stability due to prevention of change in viscosity with time, and having high reliability due to reduction of gas generation during a defatting is provided. The conductive paste is composed of a conductive powder having an average particle diameter of about 1.0 $\mu$m or less, an organic vehicle, an anionic macromolecular dispersing agent, and an amine having a boiling point of about 120° C. or more, but about 220° C. or less and constitutes about 0.1% to 5% by weight of 100% by weight of the conductive paste.

16 Claims, 1 Drawing Sheet

CONDUCTIVE PASTE AND LAMINATED CERAMIC ELECTRONIC COMPONENT

BACKGROUND OF THE INVENTION

1. Field of the Invention

The present invention relates to a conductive paste used for forming electrodes of electronic components, and to a laminated ceramic electronic component using the conductive paste. In particular, the present invention relates to a conductive paste appropriately used for forming internal electrodes of a monolithic ceramic capacitor, and to a monolithic ceramic capacitor in which internal electrodes are formed using the conductive paste.

2. Description of the Related Art

Laminated ceramic electronic components, for example, monolithic ceramic capacitors, have hitherto been primarily composed of ceramic laminates, internal electrodes, and terminal electrodes. The ceramic laminate is produced, for example, by baking a green laminate in which a plurality of green ceramic layers made of dielectric material are laminated. The internal electrodes are arranged between ceramic layers in the ceramic laminate, and are produced by the concurrent baking of a conductor paste applied on a plurality of green ceramic layers by printing and the green ceramic layers. Each of the end edges of the internal electrodes is formed so as to be exposed at one of the end faces of the aforementioned ceramic layers. The terminal electrodes are produced by baking a conductive paste applied by coating to the end faces of the ceramic laminate so as to connect to the internal electrodes exposed at the end faces of the ceramic laminate.

In order to form the internal electrodes of the aforementioned laminated ceramic electronic component, a conductive paste has been used. As the conductive paste, a paste in which a fine conductive powder made of Ni, Cu, Ag, Pd, etc., is dispersed in an organic vehicle composed of an organic binder and a solvent has been used.

In the case where a fine conductive powder having a particle diameter of 1.0 $\mu$m or less is used for the conductive paste, the viscosity of the paste increases with time after production due to coagulation of the conductive powder. As a consequence, when this paste is applied by printing on a green ceramic layer using a screen printing method, etc., the film thickness of the printed coating film is likely to fluctuate. When the film thickness of the coating film is uneven, there has been a problem that delamination and cracks are likely to occur in the ceramic laminate produced by baking due to unevenness in volume change.

As an effective method for uniformly dispersing the aforementioned fine conductive powder in the paste, a method in which a dispersing agent is added in the paste can be mentioned. That is, since the surface of the conductive powder of Ni, Cu, etc., is basic, in consideration of, for example, interaction between acid and base, a method in which an anionic macromolecular dispersing agent is added can be mentioned.

By adding the dispersing agent into the paste, wetting of the conductive powder with the solvent is accelerated and a uniform mixture can be formed in a short time. However, the adsorption sites of the macromolecular dispersing agent are likely to form a three-dimensional cross-linking structure with not only one particle, but also a plurality of particles. When such a cross-linking structure is formed, an increase in viscosity of the paste and gelation of the paste are brought about. As a measure for improvement, the inventors of the present invention have discovered a method in which an amine surfactant is further added into a paste in order to mask excessive adsorption sites of an anionic macromolecular dispersing agent, as described in Japanese Patent Application No. 11-180450.

However, since the amine surfactants have, in general, high burning temperatures of about 300° C., even when the aforementioned conductive paste is applied by printing on the green ceramic layers and this is dried sufficiently, the amine surfactant is likely to remain in the coating film after printing. In baking the green ceramic laminate in which a plurality of green ceramic layers provided with the aforementioned electrode dried films are laminated, when a temperature raising rate is increased during defatting, the amine surfactant remaining in the coating film is burned so as to rapidly generate gases. The gas generation causes the volume of the ceramic laminate to expand, and a problem may occur in that peeling is likely to occur at the interface between the internal electrode and the ceramic layer.

SUMMARY OF THE INVENTION

The present invention was made in order to solve the aforementioned problems. Accordingly, it is an object of the present invention to provide a conductive paste in which increase in viscosity with time is prevented and gas generation can be reduced during defatting, and a laminated ceramic electronic component.

In order to achieve the aforementioned objects, according to an aspect of the present invention, a conductive paste composed of a conductive powder having an average particle diameter of about 1.0 $\mu$m or less, an organic vehicle, an anionic macromolecular dispersing agent, and an amine having a boiling point of about 120° C. or more, but about 220° C. or less, is provided, wherein the amine constitutes about 0.1% to 5% by weight of 100% by weight of the conductive paste.

The amine in the conductive paste according to the present invention preferably includes at least one tertiary nitrogen atom.

The conductive powder in the conductive paste according to the present invention preferably includes at least one powder selected from the group consisting of a Ni powder, a Cu powder and a powder of an alloy thereof.

According to another aspect of the present invention, a laminated ceramic electronic component composed of a ceramic laminate produced by laminating a plurality of ceramic layers and a plurality of internal electrodes formed between the ceramic layers is provided, wherein the internal electrodes are formed using the conductive paste according to the present invention.

DESCRIPTION OF THE PREFERRED EMBODIMENTS

Figure 1:
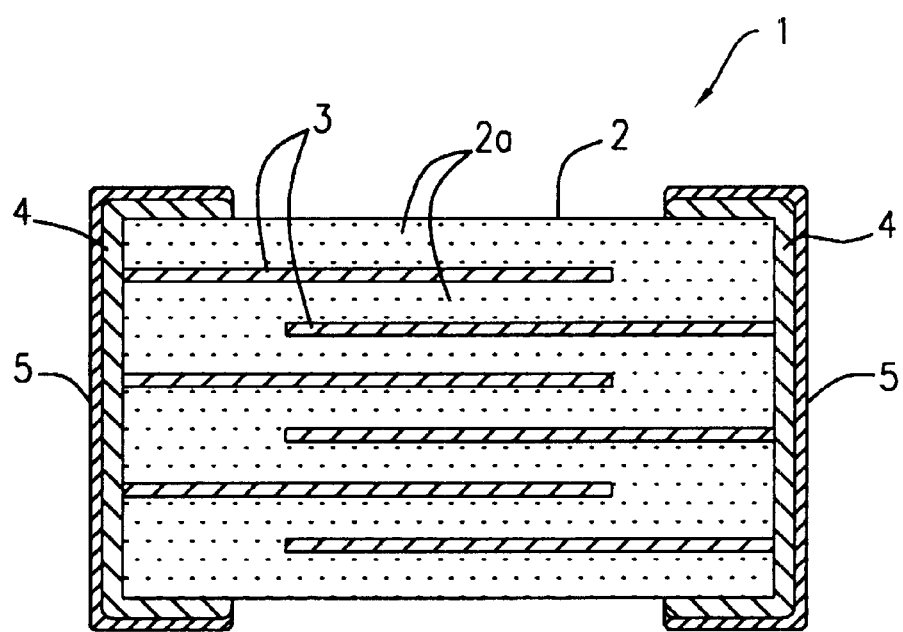
FIG. 1 is a sectional view of a laminated ceramic electronic component according to an embodiment of the present invention.

A conductive paste according to the present invention is composed of a conductive powder having an average particle diameter of about 1.0 $\mu$m or less, an organic vehicle, an anionic macromolecular dispersing agent, and, in addition to these, an amine having a boiling point of about 120° C. or more, but about 220° C. or less. This amine has, for example, about 12 carbon atoms or less, and a relatively low molecular weight of about 200 or less, preferably about 150 or less. This amine volatilizes by vaporization, while an amine surfactant volatilizes by thermal decomposition and burning.

When the aforementioned amine was included in a paste, a conductive paste having a viscosity which was stable for the long term could be produced. Furthermore, during defatting in baking a green ceramic laminate provided with electrode films to become internal electrodes formed using the aforementioned paste, even when a temperature raising rate was increased, peeling at the interface between the internal electrodes and the ceramic layers in the ceramic laminate could be prevented.

An amine having a boiling point of less than about 120° C. very intensely vaporizes at ordinary temperatures, so that the amine has poor stability. In conductive paste including the aforementioned amine, the viscosity increased with time. This is because since the aforementioned amine very intensely vaporizes at ordinary temperatures, vaporization occurs in the conductive paste, and the quantity sufficient to mask excess adsorption sites of a dispersing agent cannot be maintained. On the other hand, regarding a conductive paste including an amine having a boiling point exceeding about 220° C., the viscosity was stable with time, although during a step of defatting in baking a green ceramic laminate, peeling at the interface between the internal electrodes and the ceramic layers frequently occurred when a temperature raising rate was increased.

The content of the aforementioned amine in the conductive paste according to the present invention must be about 0.1% to 5% by weight relative to 100% by weight of the conductive paste.

When the content of the aforementioned amine is about 0.1% by weight or more, the effect of the present invention of preventing the increase of viscosity with time can be further preferably achieved. Furthermore, when the addition quantity is about 5% by weight or less, a conductive paste having a viscosity suitable for a printing paste can be produced.

The aforementioned amine preferably includes at least one tertiary nitrogen in the structure thereof. A conductive paste including this amine has extremely superior long-term viscosity stability. In general, when there is no effect of solvation, basicity of the amine is not affected by a steric effect due to bulkiness of the alkyl group bonded with the N group, but is affected by an inductive effect due to the electron donating property of the alkyl group, so that the basicity of the amine is determined. That is, the basicity of the amine is in the order of tertiary>secondary>primary. Since an amine including the tertiary nitrogen has a higher effect of masking the excessive adsorption sites of the anionic macromolecular dispersing agent, for example, a polycarboxylic acid dispersing agent, the viscosity of the paste itself is likely to be stabilized. Since a secondary nitrogen has reduced basicity, it cannot mask all of the excessive adsorption sites of the anionic macromolecular dispersing agent. As a consequence, remaining excessive adsorption sites form three-dimensional coagulation, so that the initial viscosity tends to be increased. However, even when the secondary nitrogen is included, the viscosity is stabilized after completion of formation of the three-dimensional coagulation by remaining adsorption sites.

As the amine which can impart the aforementioned long-term viscosity stability and the effect of preventing peeling at the interface between the internal electrode and the ceramic layer, for example, triallylamine, tri-n-octylamine, tripropylamine, tributylamine, diethylaminoethylamine, N,N-diisopropylaminoethylamine, tetramethylethylenediamine, dimethylaminopropylamine, diethylaminopropylamine, dibutylaminopropylamine, tetramethyl-1,3-diaminopropane, N,N,N',N'-tetramethylhexamethylenediamine, methyliminobispropylamine and pentamethyldiethylenetriamine, are mentioned.

The conductive powder used for the conductive paste according to the present invention preferably includes at least one powder selected from the group consisting of a Ni powder, a Cu powder, and a powder of an alloy thereof, although it is not specifically limited thereto. The aforementioned metal powder functions as a conductive component in the conductive paste.

Next, an embodiment of the laminated ceramic electronic component according to the present invention will be explained in detail with reference to FIG. 1.

A laminated ceramic electronic component 1 is composed of a ceramic laminate 2, internal electrodes 3, terminal electrodes 4, and plating films 5.

The ceramic laminate 2 is produced, for example, by baking a green ceramic laminate in which a plurality of ceramic layers 2a made of dielectric material primarily containing $BaTiO_3$ are laminated.

The internal electrodes 3 are arranged between the ceramic layers 2a in the ceramic laminate 2, and are produced by the concurrent baking of a conductor paste according to the present invention applied by printing on a plurality of green ceramic layers 2a and the green ceramic laminate in which the conductive paste is laminated together with the green ceramic layers. Each of the end edges of the internal electrodes 3 is formed so as to be exposed at one of the end faces of the ceramic layers 2.

The terminal electrodes 4 are produced by baking a conductive paste applied by coating to the end faces of the ceramic laminate 2 so as to electrically and mechanically connect to the end of the internal electrodes 3 exposed at the end faces of the ceramic laminate 2.

The plating films 5 are made of, for example, electroless plating of Sn, Ni, etc., and solder plating, and at least one layer thereof is formed on the terminal electrodes 4.

The material for the ceramic laminate 2 of the laminated ceramic electronic component according to the present invention is not limited to the aforementioned embodiment, and for example, it may be made of $PbZrO_3$ and other dielectric materials, insulators, magnetic materials and semiconductor materials. The number of layers of the internal electrode of the laminated ceramic electronic component according to the present invention is not limited to the aforementioned embodiment, and any arbitrary number of layers may be formed. There is no necessity to provide the plating films 5, although any arbitrary number of layers may be formed.

EXAMPLES

The present invention will be explained below using specified embodiments.

Example 1 parts by weight of ethyl cellulose resin powder was added to 90 parts by weight of terpineol, and these were uniformly mixed with an agitator so as to prepare an organic vehicle. 30 parts by weight of the aforementioned organic vehicle, 5 parts by weight of polyacrylic acid-polyacrylic acid ester anionic macromolecular dispersing agent and 55 parts by weight of Cu powder having an average particle diameter of 1.0 μm were mixed, and were uniformly dispersed using a triple roller mill so as to prepare a dispersion paste.

Diethylaminoethylamine having a boiling point of 145° C. was prepared in order that the content of diethylaminoethylamine relative to 100% by weight of conductive paste produced by mixing diethylaminoethylamine and the aforementioned dispersion paste become the content as shown in Table 1. This was added into the aforementioned dispersion paste transferred into a mortar and these were mixed so as to produce conductive pastes of Samples 2 to 5. As the conductive paste of Sample 1, a conductive paste to which diethylaminoethylamine was not added was used as it was.

Subsequently, initial viscosities and viscosities 30 days after the production were measured, and changes in viscosities with time were examined and evaluated. The results thereof are summarized in the following Table 1.

The measurements of the initial viscosity and the viscosity of after 30 days were performed using an E type viscometer manufactured by TOKIMEC INC., at 25° C. with 2.5 rpm. Regarding the initial viscosity of the paste used for the evaluation, the allowable range was specified to be 20±3 Pa·s. A viscosity change rate was determined based on the following formula.

viscosity change rate (%)=(viscosity of after 30 days−initial viscosity)/initial viscosity×100

TABLE 1

| Sample | Diethylaminoethylamine Content (%) | Viscosity(Pa · s) Initial | Viscosity(Pa · s) After 30 Days | Viscosity Change Rate (%) |
|---|---|---|---|---|
| 1 | — | 35.8 | 86.2 | 140.8 |
| 2 | 0.05 | 31.4 | 68.2 | 117.2 |
| 3 | 1.50 | 20.5 | 20.9 | 2.0 |
| 4 | 3.50 | 18.4 | 18.5 | 0.5 |
| 5 | 5.50 | 14.1 | 9.2 | −34.8 |

As is clear from Table 1, the conductive pastes of Samples 3 and 4 (in which diethylaminoethylamine was included in the range of about 0.1% to 5% by weight relative to 100% by weight of the conductive paste) had the initial viscosities of 18.4 to 20.5 Pa·s and the viscosity of after 30 days of 18.5 to 20.9 Pa·s. Either paste had viscosities suitable for screen-printing. The viscosity change rates were low as 0.5% to 1.5%, and the stability with time was superior as well.

On the other hand, the conductive paste of Sample 1 in which diethylaminoethylamine was not included, had the initial viscosity of 35.8 Pa·s, so that this paste had the viscosity suitable for screen-printing. However, the viscosity of after 30 days was high as 86.2 Pa·s, and the viscosity change rate was 140.8%.

The conductive paste of Sample 2 in which 0.05% by weight of diethylaminoethylamine was included, had the initial viscosity of 31.4 Pa·s, so that this paste had the viscosity suitable for screen-printing. However, the viscosity of after 30 days was high as 68.2 Pa·s, and the viscosity change rate was increased to 117.2%.

The conductive paste of Sample 5 in which 5.50% by weight of diethylaminoethylamine was included, had the initial viscosity of 14.1 Pa·s, so that this was lower than the allowable range of the initial viscosity. Furthermore, the viscosity of after 30 days was also low as 9.2 Pa·s, and the viscosity change rate was −34.8%, that is, the viscosity changed by a large degree.

Example 2

A paste, which was the same with the paste prepared in the aforementioned Example 1, and the conductive paste of Sample 3 were prepared.

Dimethylaminomethylamine having a boiling point of 106° C. and N,N,N',N'-tetraallyl-1,4-diaminobutane having a boiling point of 250° C. were prepared in order that the content of these amines relative to 100% by weight of conductive paste produced by mixing each of these amines and the aforementioned dispersion paste becomes 1.5% by weight. Each amine was added into the aforementioned dispersion paste transferred into a mortar and these were mixed so as to produce conductive pastes of Samples 6 and 7. The boiling point of diethylaminoethylamine included in the conductive paste of Sample 3 produced in Example 1 was 145° C.

Subsequently, initial viscosities and viscosities 30 days after the production were measured, and changes in viscosities with time were examined and evaluated. The results thereof are summarized in Table 2. The evaluations of the initial viscosity, the viscosity after 30 days, and the viscosity change rate were performed in a manner similar to those in the aforementioned Example 1.

TABLE 2

| | Amine | | Viscosity (Pa · s) | | Viscosity Change |
|---|---|---|---|---|---|
| Sample | Name | Boiling Point (° C.) | Initial | After 30 Days | Rate (%) |
| 3 | Diethylaminoethylamine | 145 | 20.5 | 20.9 | 2.0 |
| 6 | Dimethylaminomethylamine | 106 | 21.8 | 37.1 | 70.2 |
| 7 | N,N,N',N'-tetraallyl-1,4-diaminobutane | 250 | 22.6 | 24.0 | 6.2 |

As is clear from Table 2, the conductive pastes of Samples 3 and 7 including diethylaminoethylamine and N,N,N',N'-tetraallyl-1,4-diaminobutane, respectively, each having a boiling point of 120° C. or more, had the initial viscosities of 20.5 Pa·s and 22.6 Pa·s, respectively, and the viscosity after 30 days was 20.9 Pa·s and 24.0 Pa·s, respectively. Either paste had viscosities suitable for screen-printing. The viscosity change rates were low as 2.0% and 6.2%, and the stabilities with time were superior as well.

On the other hand, the conductive paste of Sample 6 including dimethylaminomethylamine having a boiling point of 106° C., had the initial viscosity of 21.8 Pa·s, so that this paste had the viscosity suitable for screen-printing. However, the viscosity of after 30 days was high as 37.1 Pa·s, and the viscosity change rate was increased to 70.2%.

Example 3

A paste, which was the same with the paste prepared in the aforementioned Example 1, and the conductive paste of Sample 3 were prepared.

Ethylaminoethylamine having a boiling point of 130° C., not including a tertiary nitrogen but a secondary nitrogen in the amine structure, and the surfactant oxyethylenedodecylamine having a burning temperature of 300° C. were prepared in order that the content of these amines relative to 100% by weight of conductive paste produced by mixing each of these amines and the aforementioned dispersion paste becomes 1.5% by weight. Each amine was added into the aforementioned dispersion paste transferred into a mortar and these were mixed so as to produce conductive pastes of Samples 8 and 9. Diethylaminoethylamine, which was included in the conductive paste of Sample 3 produced in Example 1 and had the boiling point of 145° C., includes a tertiary nitrogen in the amine structure.

Subsequently, initial viscosities and viscosities 7, 15, and 30 days after the production were measured, and changes in viscosities with time were examined and evaluated. The results thereof are summarized as shown in Table 3. The measurements and evaluations of the initial viscosity, the viscosities after 7, 15, and 30 days, and the viscosity change rate were performed in a manner similar to those in the aforementioned Example 1.

TABLE 3

| Sample | Amine | Viscosity (Pa · s) | | | | Viscosity Change Rate (%) |
| --- | --- | --- | --- | --- | --- | --- |
| | | Initial | After 7 Days | After 14 Days | After 30 Days | |
| 3 | Diethylaminoethylamine | 20.5 | 20.6 | 20.8 | 20.9 | 2.0 |
| 8 | Ethylaminoethylamine | 22.6 | 26.9 | 28.4 | 30.4 | 34.5 |
| 9 | Oxyethylenedodecylamine | 21.7 | 22.5 | 22.4 | 22.6 | 4.1 |

As is clear from Table 3, the conductive pastes of Samples 3 and 9 including diethylaminoethylamine including a tertiary nitrogen in the amine structure and oxyethylenedodecylamine, respectively, had the initial viscosities of 20.5 Pa·s and 21.7 Pa·s, respectively, and the viscosity after 30 days was 20.9 Pa·s and 22.6 Pa·s, respectively. Either paste had a viscosity suitable for screen-printing. The viscosity change rates were low as 2.0% and 4.1%, and the stabilities with time were superior as well.

The conductive paste of Sample 8 including ethylaminoethylamine not including a tertiary nitrogen but a secondary nitrogen in the amine structure, had the initial viscosity of 22.6 Pa·s and the viscosity after 30 days was 30.4 Pa·s. Either viscosity was allowable for a screen-printing paste. The viscosity change rate was high as 34.5% compared to that of the aforementioned Sample 9, although it was within the allowable range in practice.

Example 4

Conductive pastes of Samples 3, 7, 8 and 9 produced in the aforementioned Examples 1, 2 and 3, were prepared. Each of diethylaminoethylamine, which was included in the conductive paste of Sample 3 produced in Example 1 and had a boiling point of 145° C., N,N,N',N'-tetraallyl-1,4-diaminobutane which was included in the conductive paste of Sample 7 produced in Example 2 and had a boiling point of 250° C., and ethylaminoethylamine, which was included in the conductive paste of Sample 8 produced in Example 3 and had a boiling point of 130° C., are amines, rather than an amine surfactant. On the other hand, oxyethylenedodecylamine, which was included in the conductive paste of Sample 9 produced in Example 3 and had a burning temperature of 300° C., is an amine surfactant.

Each of the conductive pastes of Sample 3, 7, 8 and 9 was applied by screen printing on green ceramic layers made of dielectric material primarily containing $BaTiO_3$, and these were dried at 100° C. for 5 minutes so as to produce dried electrode films. A plurality of resulting films were laminated together with the green ceramic layers, and thereafter, thermocompression bonding, defatting and baking were performed so as to produce ceramic laminates of Samples 3, 7, 8 and 9, each having a size of 3 mm by 5 mm and including 100 layers of internal electrodes. Fifty test pieces of each of samples in which the temperature raising rates during the defatting were 1° C./min and 10° C./min were produced.

Subsequently, the laminates of Samples 3, 7, 8 and 9 were polished and cross sections thereof were observed with an optical microscope so that the number of test pieces in which peeling at the interface between the internal electrode and the ceramic layer occurred was counted and evaluated. The results thereof are summarized in Table 4.

TABLE 4

| | | Number of Peeling Occurrences at Internal Electrode-Ceramic Interface (n = 50) | |
| --- | --- | --- | --- |
| Sample | Amine | At a Temperature Raising Rate of 1° C./min | At a Temperature Raising Rate of 10° C./min |
| 3 | Diethylaminoethylamine | 0 | 0 |
| 7 | N,N,N',N'-tetraallyl-1,4-diaminobutane | 0 | 20 |
| 8 | Ethylaminoethylamine | 0 | 3 |
| 9 | Oxyethylene-dodecylamine | 0 | 25 |

As is clear from Table 4, peeling at the interface between the internal electrode and the ceramic layer did not occur with the conductive paste of Sample 3 including diethylaminoethylamine which was an amine and not an amine surfactant, and had a boiling point of 145° C. within the range of 120° C. to 220° C., regardless of the temperature raising rates during the step of defatting.

With the conductive paste of Sample 8 including ethylaminoethylamine which was an amine and not an amine surfactant, and had a boiling point of 130° C. within the range of 120° C. to 220° C., when the temperature raising rate during the step of defatting was 1° C./min, peeling at the interface between the internal electrode and the ceramic layer did not occur, and when the temperature raising rate was 10° C./min, interface peeling occurred, although at only three places. However, the number thereof was less than 10% (5 pieces) relative to total number (n=50), and this was within the allowable range in practice.

On the other hand, with the conductive paste of Sample 7 including N,N,N',N'-tetraallyl-1,4-diaminobutane which had a boiling point of 250° C., when the temperature raising rate during the step of defatting was 1° C./min, the number peeling at the interface between the internal electrode and the ceramic layer was 0, although when the temperature raising rate was 10° C./min, the number peeling at the interface between the internal electrode and the ceramic layer increased to 25.

As to the conductive paste of Sample 9 including oxyethylenedodecylamine, which was a conventional amine surfactant and had a burning temperature of 300° C., when the temperature raising rate during defatting was 1° C./min, the number peeling at the interface between the internal electrode and the ceramic layer was 0, although when the temperature raising rate was 10° C./min, the number peeling at the interface between the internal electrode and the ceramic layer increased to 25.

Example 5

Conductive pastes of Samples 3, 7, 8 and 9 produced in the aforementioned Examples 1, 2, and 3, were prepared. The boiling point of diethylaminoethylamine, the boiling point of N,N,N',N'-tetraallyl-1,4-diaminobutane, the boiling point of ethylaminoethylamine, and the burning temperature of oxyethylenedodecylamine, which were included in the conductive pastes of Samples 3, 7, 8 and 9, were 145° C., 250° C., 130° C. and 300° C., respectively.

30 mg of each of the conductive pastes of Samples 3, 7, 8 and 9 was weighed on an aluminum pan of 5 mm in diameter, and the temperature thereof was raised to 100° C., which was the same temperature as that during the step of drying after printing of the conductive paste, at 10° C./min, and the temperature was maintained for 60 minutes. Subsequently, the quantity of weight reduction was measured and summarized with evaluation as shown in Table 5. The measurement of the quantity of weight reduction was performed by TG-DTA using a differential thermobalance TG8120 manufactured by Rigaku Corporation. The weight reduction rate was determined from the measurement results based on the following formula:

weight reduction rate (% by weight)=reduction quantity until weight reduction reaches equilibrium/sample introduction quantity.

TABLE 5

| Sample | Amine | Burning Temperature or Boiling Point (° C.) | Weight Reduction Rate (% by weight) |
|---|---|---|---|
| 3 | Diethylaminoethylamine | 145 (Boiling) | 30.1 |
| 7 | N,N,N',N'-tetraallyl-1,4-diaminobutane | 250 (Boiling) | 29.0 |
| 8 | Ethylaminoethylamine | 130 (Boiling) | 30.2 |
| 9 | Oxyethylene-dodecylamine | 300 (Burning) | 28.9 |

As is clear from Table 5, regarding the conductive paste of Sample 3 including diethylaminoethylamine which was an amine, but not an amine surfactant, and had a boiling point of 145° C. within the range of about 120° C. to 220° C., the weight reduction rate was 30.1% by weight, and this was clearly greater than that of the conductive paste of Sample 9 including oxyethylenedodecylamine, which was an amine surfactant, so that it was made clear that the conductive paste can sufficiently volatilize during the step of drying.

Likewise, regarding the conductive paste of Sample 8 including ethylaminoethylamine which was an amine, but not an amine surfactant, and had a boiling point of 130° C. within the range of about 120° C. to 220° C., the weight reduction rate was 30.2% by weight, and this was clearly greater than that of the conductive paste of Sample 9 including oxyethylenedodecylamine, which was an amine surfactant, so that it was made clear that the conductive paste can sufficiently volatilize during the step of drying.

On the other hand, regarding the conductive paste of Sample 7 including N,N,N',N'-tetraallyl-1,4-diaminobutane which was an amine, but not an amine surfactant, and had a boiling point of 250° C., the weight reduction rate was 29.0% by weight, and this was nearly equivalent to that of the conductive paste of Sample 9 including oxyethylenedodecylamine, which was an amine surfactant.

As described above, regarding the conductive pastes of Samples 3, 4 and 8 including diethylaminoethylamine or ethylaminoethylamine which was amines, but not an amine surfactant, and had a boiling point within the range of 120° C. to 220° C., each of the evaluation result of viscosity change, the evaluation result of interface peeling, and the evaluation result of weight reduction was superior.

In particular, the conductive pastes of Samples 3 and 4 including diethylaminoethylamine, which includes at least one tertiary nitrogen in the molecular structure thereof, were superior in every evaluation item.

On the other hand, regarding the conductive paste of Sample 6 including dimethylaminomethylamine, which was an amine, but not an amine surfactant, and had a boiling point less than 120° C., the viscosity of the paste degraded with time. Regarding the conductive paste of Sample 7 including N,N,N',N'-tetraallyl-1,4-diaminobutane which was an amine, but not an amine surfactant, and had a boiling point exceeding 220° C., although the viscosity change with time was reduced, peeling at the interface occurred and the weight reduction rate was also reduced.

As described above, the conductive paste according to the present invention is composed of the conductive powder having an average particle diameter of about 1.0 mm or less, the organic vehicle, the anionic macromolecular dispersing agent, and the amine having a boiling point of about 120° C. or more, but about 220° C. or less, wherein the amine constitutes about 0.1% to 5% by weight of 100% by weight of the conductive paste. Therefore, a laminated ceramic electronic component having superior reliability can be produced in which increase in viscosity of the paste with time is prevented so as to achieve superior stability with time, gas generation during the step of defatting is reduced, so that volume expansion of the ceramic laminate is prevented, and peeling at the interface between the internal electrode and the ceramic layer is prevented.

Since the amine included in the conductive paste according to the present invention preferably includes at least one tertiary nitrogen in the structure thereof, the effect of preventing increase in viscosity of the paste with time is reliably achieved. Therefore, the laminated ceramic electronic component, in which volume expansion of the ceramic laminate is prevented, and peeling at the interface between the internal electrode and the ceramic layer is prevented, can be reliably produced.

The laminated ceramic electronic component according to the present invention is composed of a ceramic laminate produced by laminating a plurality of ceramic layers and a plurality of internal electrodes formed between the ceramic layers. Since the internal electrodes are formed using the conductive paste according to the present invention, gas generation during defatting is reduced so that the effects of preventing volume expansion of the ceramic laminate and preventing peeling at the interface between the internal electrode and the ceramic layer can be achieved.

What is claimed is:

1. A conductive paste comprising:
   a conductive powder having an average particle diameter of about 1.0 μm or less;
   an organic vehicle;
   an anionic macromolecular dispersing agent; and
   an amine having a boiling point of about 120° C. to 220° C., wherein said amine constitutes about 0.1% to 5% by weight of the weight of the conductive paste.

2. A conductive paste according to claim 1, wherein said amine has at least one tertiary nitrogen in the structure thereof.

3. A conductive paste according to claim 2, wherein said conductive powder comprises at least one powder selected from the group consisting of a Ni powder, a Cu powder and a powder of an alloy thereof.

4. A conductive paste according to claim 3, wherein said amine has up to about 12 carbon atoms.

5. A conductive paste according to claim 4, wherein said amine is a diethylaminoethylamine.

6. A conductive paste according to claim 1, wherein said conductive powder comprises at least one powder selected from the group consisting of a Ni powder, a Cu powder and a powder of an alloy thereof.

7. A conductive paste according to claim 1, wherein said amine has up to about 12 carbon atoms.

8. A conductive paste according to claim 1, wherein said amine is a diethylaminoethylamine.

9. A laminated ceramic electronic component comprising:
   a ceramic laminate comprising a plurality of laminated ceramic layers; and
   a plurality of internal electrodes each of which is disposed between a pair of said ceramic layers,
   wherein said internal electrodes are a burned conductive paste according to claim 8.

10. A laminated ceramic electronic component comprising:
    a ceramic laminate comprising a plurality of laminated ceramic layers; and
    a plurality of internal electrodes each of which is disposed between a pair of said ceramic layers,
    wherein said internal electrodes are a burned conductive paste according to claim 7.

11. A laminated ceramic electronic component comprising:
    a ceramic laminate comprising a plurality of laminated ceramic layers; and
    a plurality of internal electrodes each of which is disposed between a pair of said ceramic layers,
    wherein said internal electrodes are a burned conductive paste according to claim 6.

12. A laminated ceramic electronic component comprising:
    a ceramic laminate comprising a plurality of laminated ceramic layers; and
    a plurality of internal electrodes each of which is disposed between a pair of said ceramic layers,
    wherein said internal electrodes are a burned conductive paste according to claim 5.

13. A laminated ceramic electronic component comprising:
    a ceramic laminate comprising a plurality of laminated ceramic layers; and
    a plurality of internal electrodes each of which is disposed between a pair of said ceramic layers,
    wherein said internal electrodes are a burned conductive paste according to claim 4.

14. A laminated ceramic electronic component comprising:
    a ceramic laminate comprising a plurality of laminated ceramic layers; and
    a plurality of internal electrodes each of which is disposed between a pair of said ceramic layers,
    wherein said internal electrodes are a burned conductive paste according to claim 3.

15. A laminated ceramic electronic component comprising:
    a ceramic laminate comprising a plurality of laminated ceramic layers; and
    a plurality of internal electrodes each of which is disposed between a pair of said ceramic layers,
    wherein said internal electrodes are a burned conductive paste according to claim 2.

16. A laminated ceramic electronic component comprising:
    a ceramic laminate comprising a plurality of laminated ceramic layers; and
    a plurality of internal electrodes each of which is disposed between a pair of said ceramic layers,
    wherein said internal electrodes are a burned conductive paste according to claim 1.

* * * * *